United States Patent [19]

Vaughan

[11] Patent Number: 5,000,932
[45] Date of Patent: * Mar. 19, 1991

[54] MAZZITE-TYPE ZEOLITE, ECR-15, AND A PROCESS FOR PREPARING IT

[75] Inventor: David E. W. Vaughan, Flemington, N.J.

[73] Assignee: Exxon Research and Engineering Company, Florham Park, N.J.

[*] Notice: The portion of the term of this patent subsequent to Apr. 14, 2004 has been disclaimed.

[21] Appl. No.: 296,477

[22] Filed: Jan. 12, 1989

Related U.S. Application Data

[63] Continuation of Ser. No. 922,667, Oct. 24, 1986, abandoned, which is a continuation-in-part of Ser. No. 822,150, Jan. 24, 1986, abandoned.

[51] Int. Cl.$^5$ ............................................. C01B 33/28
[52] U.S. Cl. .................................. 423/328; 423/329; 502/77
[58] Field of Search ............... 423/326, 328, 329, 330; 502/60–62, 77

[56] References Cited

U.S. PATENT DOCUMENTS 4,657,748  4/1987  Vaughan et al. .................. 423/328

OTHER PUBLICATIONS

Leonowicz, M. E. et al., "Proposed Synthetic Zeolite ECR-1 Structure Gives a New Zeolite Framework Topology" Nature, vol. 329, 29 Oct. 1987, pp. 819-821.

Primary Examiner—John Doll
Assistant Examiner—R. Bruce Breneman
Attorney, Agent, or Firm—ROnald D. Hantman

[57] ABSTRACT

The present invention relates to an aluminosilicate, designated as ECR-15, having the mazzite structure and containing dimethylammonium organic ions. It also relates to a process for preparation of the zeolite.

12 Claims, 4 Drawing Sheets

MAZZITE-TYPE ZEOLITE, ECR-15, AND A PROCESS FOR PREPARING IT

CROSS REFERENCE TO RELATED APPLICATIONS

This application is a continuation of application Ser. No. 922,667 filed Oct. 24, 1986, now abandoned, which in turn was a continuation-in-part application of copending Ser. No. 822,150, filed Jan. 24, 1986 now abandoned.

FIELD OF THE INVENTION

The present invention relates to a zeolite, designated as ECR-15, having a structure similar to mazzite, ZSM-4 or Omega and containing dimethyldiethylammonium organic ions as the major organic cation. It also relates to a process for preparation of the zeolite.

BACKGROUND OF THE INVENTION

Zeolites, both natural and synthetic, have been used in a variety of catalytic and adsorptive operations. Most zeolitic materials are porous ordered aluminosilicates having a definite (although often undetermined) crystal structure. The structure may have a number of smaller cavities interconnected by a number of channels. Those cavities and channels are uniform in size within a certain zeolitic material. The above-mentioned catalytic and adsorptive processes make use of these cavities and channels by proper choice of zeolite. The zeolite channels will reject some molecules because of their size and accept others.

These zeolites typically are describable as a rigid three-dimensioned framework of silica and alumina wherein the silica and alumina tetrahedra are linked through common oxygens. The charge balance of the zeolite may be satisfied by inclusion of a proton, metal, or ammonium cation. The catalytic and adsorption properties of the zeolite may be varied by changing the ions within the zeolite. Conventional ion exchange techniques may be used to change these cations.

There are a large number of both natural and synthetic zeolitic structures. The wide breadth of such numbers may be understood by considering the work *Atlas of Zeolite Structures* by W. M. Meier and D. H. Olson.

Included in these zeolites is a structure known as mazzite. The mineral was first described by E. Galli in *Cryst. Str. Commun.*; 3, p. 339, 1974. Various synthetic mazzite-like materials have been made using a variety of techniques, mainly using tetramethylammonium (TMA) cations as templates. These synthetic mazzites are known as ZSM-4 (U.S. Pat. No. 3,923,639) and Omega (U.S. Pat. No. 4,241,036). Others have synthesized ZSM-4 using templates other than TMA, e.g., Dabco (U.S. Pat. No. 4,331,643) and choline or pyrrolidine (U.S. Pat. No. 4,021,447). There are no reported instances of making these materials using the templates or method required by this invention.

A characteristic property of the TMA-containing materials is, however, that the TMA cation is located within the small "gmelenite" cages of the structure. When these zeolites are calcined to remove the TMA templates at temperatures over 500° C., structural degradation takes place, resulting in a partial loss of structural integrity and a degradation of sorption capacities and catalytic properties.

The use of quaternary ammonium salts as templates or reaction modifiers in the preparation of synthetic crystalline aluminosilicates (zeolites), first discovered by R. M. Barrer in 1961, has led to preparation of a number of zeolites not found in nature. For example, U.S. Pat. No. 4,086,859 discloses preparation of a crystalline zeolite thought to have the ferrierite structure (ZSM-21) using a hydroxyethyl-trimethyl sodium aluminosilicate gel. A review provided by Barrer in *Zeolites*, Vol. I, p. 136 (October, 1981) shows the zeolite types which are obtained using various ammonium organic bases as cation. In addition, Breck, *Zeolite Molecular Sieves*, John Wiley (New York, 1974), pp.348-378, provides a basic review of zeolites obtained using such ammonium cations in the synthesis thereof.

Other patents which are exemplitive of the use of organic ammonium-containing cationic templates include: U.S. Pat. No. 4,105,541 to Plank, et al., issued Aug. 8, 1978, which deals with production of ZSM-38 using a 2-(hydroxyalkyl)trialkylammonium compound where the alkyls are methyl or ethyl; U.S. Pat. No. 4,139,600 to Rollman, et al., issued Feb. 13, 1979, which discusses production of ZSM-5 using a tetraalkylammonium cation, the alkyl groups of which contain 2 to 5 carbon atoms; U.S. Pat. No. 4,375,458 to Dwyer, et al., issued Mar. 1, 1983, which suggests the production of ZSM-5-type zeolites by using combinations of TMA, tetraethylammonium (TEA), and tetrapropylammonium (TPA) as templates; and U.S. Pat. No. 4,287,166 to Dwyer, et al., issued Sept. 1, 1981, teaching the production of ZSM-39 using TEA, TMA or n-propylamine.

It is also known that even minor changes in the size or charge distribution of these large organic cations can induce the formation of different zeolite structures. U.S. Pat. No. 4,046,859 teaches that replacement of one of the methyl groups of the TMA compound with a hydroxy ethyl group causes the formation of a ferrierite-like phase (ZSM-21). Many such examples are enumerated by Barrer (*Zeolites*, 1981).

The objective of the present invention is to develop preparation methods for the synthesis of mazzite-like materials where the major organic templates are not locked into the small cavities in the structure, but are instead present in the large channels from which they can be readily removed without disruption and degradation of the host lattice. None of the literature or patents described above suggests such a material or method for making it.

SUMMARY OF THE INVENTION

The present invention deals with a crystalline polymorph (zeolite), designated for convenience herein as ECR-15, having a mazzite, ZSM-4, or Omega structure and which contains organic templates larger than TMA, e.g., dimethyl diethyl ammonium ions, within the channels of the zeolite. For the purposes of this disclosure, the term "zeolite" is meant to include aluminosilicate, gallosilicate and gallo-aluminosilicate materials.

The main organic template is of the type $R_1R_1R_2R_2N^+$ where the $R_1$ groups are methyl or hydroxymethyl groups and the $R_2$ groups are ethyl or hydroxyethyl groups. TMA is also necessarily present only in sufficient amounts to nucleate the product. Preferably less than 5% of the total organic cation.

The zeolite herein may be used as a sorbent or as a catalyst, e.g., as a hydrocarbon conversion catalyst for, e.g., cracking, hydrocracking, paraffin isomerization, aromatization and alkylation. When the product is used as a catalyst, it may be exchanged with cations from Groups II through VIII of the Periodic Table. Even after this ion exchange the alkyl or hydroxyalkylammonium cations will remain trapped in the channels of the ECR-15 structure. Those cations may be removed by calcination, and subsequent cation exchange satisfies the change deficiency of the lattice.

In another embodiment of this invention the novel zeolite may be prepared by a process comprising:

(a) preparing a reaction mixture comprising an oxide of sodium, an alkyl or hydroxyalkylammonium salt, a tetramethylammonium salt, water, a source of silica, a source of alumina and/or gallia and, optionally, nucleating seeds, said reaction mixture having a composition, in terms of mole ratios of oxides, within the following ranges:

| (Na,T)$_2$O:Al$_2$O$_3$ | 1.5 to 5 |
|---|---|
| SiO$_2$:Al$_2$O$_3$ | 6 to 25 |
| H$_2$O:Al$_2$O$_3$ | 100 to 450 |
| TMA/Al$_2$O$_3$ | 0.005 to 0.05 | wherein T represents an alkyl or hydroxyalkyl ammonium cation, and said seeds, if present, in an amount to yield 0.1 to 10 mole percent of the total final alumina content in said zeolite;

(b) blending the reaction mixture sufficiently to form a substantially homogeneous mixture;

(c) maintaining the reaction mixture at a temperature between about 80° C. and 200° C. under autogenous pressure for a sufficient period of time to form crystals of the zeolite; and (d) recovering the zeolite crystals.

It will be understood that the compositions herein may contain some waters of hydration (the x value above) which may be at least partially removed when the zeolites are employed as sorbents or catalysts.

DESCRIPTION OF THE PREFERRED EMBODIMENTS

Figure 1:
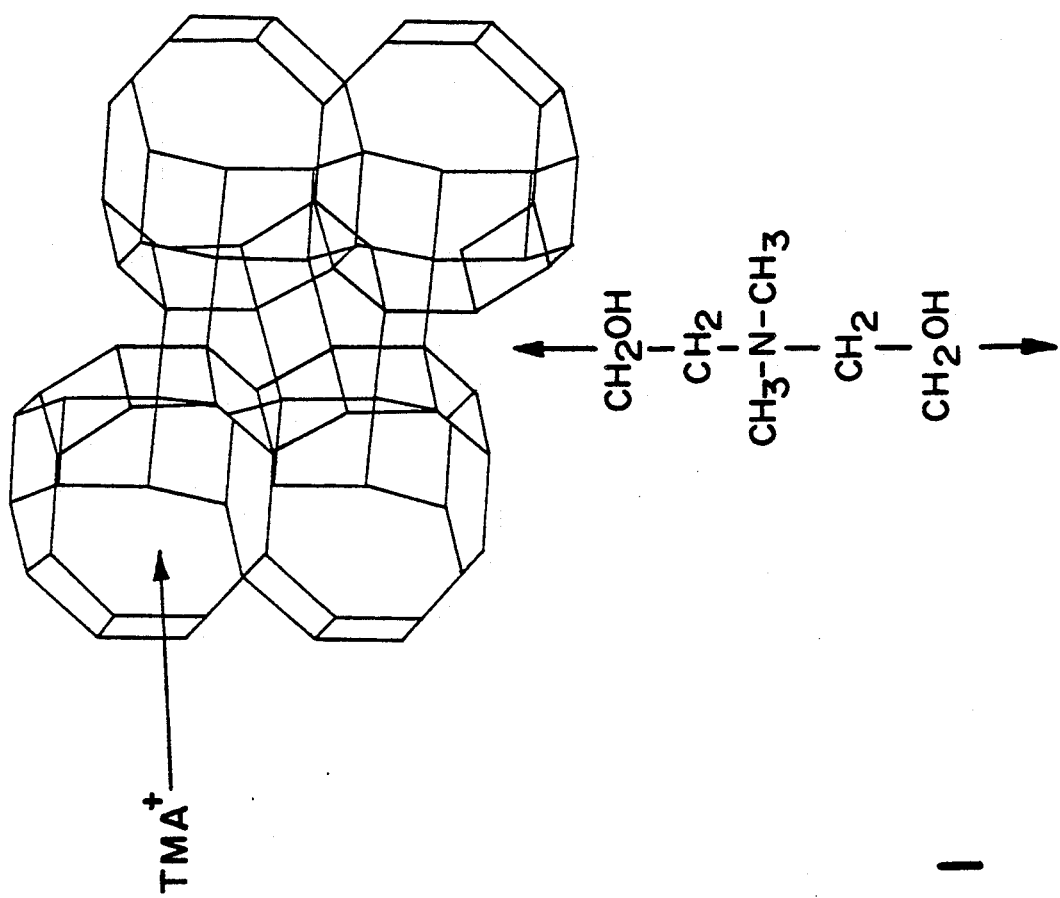
FIG. 1 is a schematic representation of the structure of mazzite, Omega, ZSM-4 and ECR-15 zeolites showing where, in the structure, the various template ions may be found.

The zeolite herein generally will have a mazzite structure similar to ZSM-4 or Omega, but will have the organic ammonium cation primarily within the large channels, but only a few in the smaller cages, as in the mazzite structure. The main organic ammonium group has the general formula R$_1$R$_1$R$_2$R$_2$N$^+$. R$_1$ is a methyl or hydroxymethyl group; the R$_2$ groups are ethyl or hydroxyethyl groups. Especially suitable cations include diethyldimethyl ammonium, (2-hydroxyethyl)dimethyl ammonium, 2-hydroxyethyl-2-hydroxymethylammonium, and diethyl-2-hydroxymethyl ammonium. The (2-hydroxyethyl) dimethyl ammonium ion is most preferred. The cation will usually be used in the form of a halide salt or as the hydroxide. Mixed cations of this group may also be used. The presence of small amounts of TMA is required to affect the ECR-15 synthesis.

The alkyl or hydroxyalkyl ammonium cations are relatively large ions which are not trapped within the small cages of the ECR-15 structure, but are present in the large 12-ring channels of the structure.

The alkyl ammonium cations are present in the zeolite in an amount equal to about 0.1 to about 0.8 moles of the alkyl ammonium cation per each mole of Al$_2$O$_3$ or Ga$_2$O$_3$ found in the zeolite.

In order to convert the inventive ECR-15 zeolites into catalysts, the organic ammonium ions are first exchanged, desorbed or degraded at high temperature. By comparison to other zeolites having ammonium ions trapped primarily in their smaller cages, the temperature of calcination is significantly lower to remove the template. As even large organic fragments produced by decomposition may easily diffuse through the large pores of the zeolite ECR-15, the effects of bond breakage and lattice degradation usually associated with the escape of such fragments from the smaller cages is not usually observed in ECR-15.

The exchangeable cations which may partially or fully replace ions found at exchange sites and the organic ammonium ions in the large channels of the ECR-15 structure may be cations of metals from any one of Groups II through VIII of the Periodic Table or rare earth metals, depending on the end use desired. Preferably, the cations will be mono-, di- and tri-valent metal cations, particularly from Groups II or III of the Periodic Table, such as barium, calcium, magnesium, strontium, zinc, or the like, or hydrogen, rare earth metals, or ammonium or alkylammonium ions. The presence of these exchangeable cations will generally not cause a substantial alteration of the basic crystal structure of the aluminosilicate. Particularly preferred are mono- and divalent cations, as they are more easily included in the pores of the zeolite crystal. An ion exchange technique may be employed, such as those discussed, for example, in U.S. Pat. No. 3,216,789.

The ECR-15 zeolite may be prepared by a process in which a reaction mixture, generally a slurry, is formed comprised of an oxide of sodium, water, the subject organic ammonium salt or hydroxide, a source of silica, a source of alumina (and/or gallia, if desired), and nucleating seeds. The oxide of sodium may be, e.g., sodium hydroxide, and the organic ammonium salt may be a sulfate, nitrate, hydroxide or halide salt, and is preferably a halide such as the chloride, iodide or bromide salt because of lower cost. The silica may be derived from sources such as, e.g., silica gels, silica acid, aqueous colloidal silica sols as described, for example, in U.S. Pat. No. 2,574,902, reactive amorphous solid silicas such as fume silicas and chemically precipitated silica sols, and potassium or sodium silicate, preferably sodium silicate. The alumina may be derived from sources such as, e.g., activated alumina, gamma alumina, alumina trihydrate, sodium aluminate, alum, kaolin, metakaolin or the like. It is noted that the sodium oxide may be provided not only directly by adding, e.g., sodium hydroxide to the mixture, but also indirectly from the source of silica and/or the source of alumina or gallia if, for example, sodium silicate and sodium aluminate (prepared by dissolving NaOH and $Al_2O_3 \cdot 3H_2O$ in water) are respectively employed as at least one of the silica and alumina sources. The preferred sources of alumina are hydrated alumina and an aluminum salt selected from the chloride, sulfate and nitrate salts.

The nucleating seeds for the reaction mixture, also known as zeolitic nucleation centers may comprise a seed slurry or chopped crystals of ECR-15, Omega, ZSM-4 or a faujasite. Generally, the seeds will have an average particle size less than 0.05 microns.

Slurries of nucleating seeds may be prepared by the process disclosed in U.S. Pat. Nos. 3,808,326 and 4,178,352, the disclosures of which are incorporated by reference. In general, the preparation procedure involves mixing of sodium silicate, sodium aluminate and water together and aging the resulting slurry at about 10° to 60° C. for about 2 to 2000 hours, with lower temperatures requiring a longer period of time. Preferably, the slurry is aged at about 20° C. for about 15 to 300 hours and the zeolite centers preferably have compositions in the range:

10 to 16 $Na_2O:Al_2O_3$:9 to 20 $SiO_2$:250 to 450 $H_2O$.

The amount of nucleating seeds present in the reaction mixture is expressed in terms of the percentage of the total molar alumina content in the zeolite product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 0.1 to 5 mole percent.

Slurries comprising recycled products of the process disclosed herein will also serve as nucleation seeds.

The relative amounts of ingredients in the reaction mixture will be such that the mixture has a composition, in terms of mole ratios of oxides, within the following ranges:

| Oxide Constituents | Ranges of Mole Ratios |
| --- | --- |
| $(Na,T)_2O:(Ga,Al)_2O_3$ | 1.5 to 5.0 |
| $SiO_2:(Ga,Al)_2O_3$ | 6 to 25 |
| $H_2O:(Ga,Al)_2O_3$ | 100 to 450 |
| $TMA/Al_2O_3$ | 0.005 to 0.05 | where T represents an organic ammonium group as described above. Preferably, the mole ratio of $H_2O$ to $(Ga,Al)_2O_3$ in the reaction mixture ranges from 100 to 250, and the mole ratio of $SiO_2$ to $(Ga,Al)_2O_3$ from 8 to 20.

The order of mixing the ingredients is not essential, and all ingredients may be added simultaneously. In one preferred method of preparation a sodium silicate solution, a slurry of nucleating seeds and an organic ammonium halide solution are added to a blender, followed by slow addition, with mixing, of a sodium aluminate solution and an alum solution. Additional water is added to the resulting slurry. The reaction mixture is ordinarily prepared in a container made of glass, TEFLON, or metal or the like which should be closed to prevent water loss.

After the reaction mixture is formed it may be homogenized by thorough blending so as to be substantially homogeneous in texture. This step is to ensure that the zeolite product ultimately obtained is not a mixture of products and thus impure. The mixing may take place in any vessel in which complete mixing, e.g., a blender.

The homogenized mixture is then placed in a reactor, ordinarily one which can withstand elevated pressures such as a tetrafluoroethylene-lined jar or an autoclave, where it is maintained at a temperature of between about 80° C. and 200° C., preferably 95° and 160° C., and, for commercial purposes, preferably no greater than 100° C. The exact temperature will depend, for example, on the amount of sodium oxide present and the length of time employed for reaction. At temperatures above about 200° C., the zeolites obtained are no longer in substantially pure form. When the homogenized mixture is heated it is maintained at autogenous pressures which will depend on the temperature employed. Lower pressures of 1 atm may be adequate for temperatures at the lower range but at higher temperatures up to 200° C., pressures of up to about 3 to 5 atm or higher may be achieved. The amount of time required for heating will depend mainly on the temperature employed, so that at 95° C. the heating may be carried out, e.g., for up to 8 days or more, whereas at, e.g., 160° C. or more the time period may be, e.g., 3 to 7 days. In any event, the heating is carried out until crystals are formed of the zeolite product, i.e., ECR-15, having a definite structure, a mole ratio of $SiO_2/(Al,Ga)_2O_3$ of at least four and the presence of organic ammonium templates removable below about 400° C. as shown by thermogravietric analysis.

The crystallization time may be shortened, if desired, by seeding the slurry before or after the blending step with minor amounts of zeolite ECR-15, Omega, ZSM-4, mazzite, or faujasite crystals which are preferably chopped at low temperatures and a size range less than about 0.05 microns before that seeding.

When the product crystals have been obtained in sufficient amount, they are recovered by centrifugation or filtration from the reaction mixture and are then washed, preferably with deionized water, to separate them from the mother liquor. The washing should continue, for best purity, until the wash water, equilibrated with the product, has a pH of between about 9 and 12. After the washing step the zeolite crystals may be dried as in a kiln.

The ECR-15 product of this invention may be used as a sorbent or as a catalyst, e.g., in a hydrocarbon conversion process such as in paraffin isomerizaion, aromatization, and alkylation and in the hydrocrackng and cracking of lube stocks, fuels and crude oils. To be employed for these applications, the aluminosilicate may be at least partially dehydrated by drying at temperatures of up to about 500° C. or more until most or all of the water of hydration is removed.

EXAMPLES

The examples which follow illustrate the efficacy of the invention. In all examples, parts and percentages are given by weight and temperatures in degrees Centigrade unless otherwise noted.

EXAMPLE 1

A seed composition
13.3 $Na_2O:Al_2O_3$:12.5$SiO_2$:267$H_2O$
was made by first dissolving 12.02 gm $Al_2O_3 3H_2O$ in a caustic solution comprising 60 gm NaOH and 100 gm $H_2O$ at reflux. After cooling to room temperature this mixture was blended into a dilute sodium silicate solution (226.3 gm $H_2O$ + 201.6 gm sodium silicate [N brand, P.Q. Corp.]). After thorough homogenization, the solution was allowed to age at room temperature for about 24 hours or more, after which time it was used as a seed or innoculant in the following Examples.

EXAMPLE 2

A typical "TMA mazzite" type material (ZSM-4) was made using a slurry stoichiometry:

3.2 $Na_2O:Al_2O_3:9\ SiO_2:0.6$ TMA Br:130$H_2O$ by mixing sodium silicate and sodium aluminate solutions together with TMA Br in the following quantities:

| | |
|---|---|
| 19.3 gm | NaOH |
| 25.1 gm | $Al_2O_3.3H_2O$ |
| 61.7 gm | $Al_2(SO_4)_3.18H_2O$ (50 wt. % solution) |
| 396.4 gm | sodium silicate (N brand, P.Q. Corp.) |
| 184.2 gm | $H_2O$ |
| 19.9 gm | tetramethyl ammonium bromide (TMA Br) |

25.1 gm $Al_2O_3.3H_2O$ were dissolved in a caustic solution comprising 19.3 gm NaOH in 60 gm $H_2O$ at 100° C. After complete dissolution of the alumina, the sodium aluminate solution was cooled to room temperature and diluted with a further 40 gm $H_2O$. The TMA Br was dissolved in 84.2 gm $H_2O$, then added to the silicate and aluminate solution with vigorous mixing; finally the alum solution was added, and homogenized. A 50 gm sample of this mixture was then placed into a 75 ml test tube autoclave and heated at 142° C. for 15 hours. After cooling, filtering, washing and drying, the product had an x-ray diffraction pattern characteristic of ZSM-4 and a composition:

0.8 $Na_2O:0.2\ (TMA_2)_2O:Al_2O_3:6.2\ SiO_2$ Thermogravimetric analysis (see FIG. 2) showed the template to decompose at 555° C. Subsequent x-ray diffraction analysis showed a broadening of the peaks compared to the non-calcined material. The $^{29}Si$-MASNMR also showed some dealumination of the framework, reflected in a shift in the center of mass of the $^{29}Si$ spectrum to higher Si/Al ratios.

EXAMPLE 3

This Example uses a dimethyl diethyl ammonium organic template to synthesize ECR-15 zeolite with the template in the zeolite channel. A composition:

1.9 $Na_2O:Al_2O_3:7.5\ SiO_2:2.4\ (M_2E_2)NI:120\ H_2O$ was made by reacting together, in the manner described in Example 2, the following components:

| | |
|---|---|
| 7.27 gm | NaOH |
| 8.1 gm | $Al_2O_3.3H_2O$ |
| 57.6 gm | Hs.40 colloidal silica (Du Pont Co.) |
| 70.2 gm | $H_2O$ |
| 66.3 gm | bis (2-hydroxyethyl) dimethyl ammonium iodide (50 wt. % solution with $H_2O$), i.e., $(M_2E_2)NI$ |

'3 C NMR analysis showed the $E_2M_2$ solution to contain trace amounts of TMA, estimated at 1%. The mixture was seeded with 6.9 gm of the seed solution produced in Example 1. The homogenized sample was placed in a test tube autoclave and reacted at 150° C. for six days. After cooling, filtering and washing, the sample gave an x-ray diffraction pattern identified in Table 1, corresponding to mazzite. Thermogravimetric analysis showed the template to "burn off" at 392° C. as shown in FIG. 2.

TABLE 1

| X-RAY DIFFRACTION PATTERN OF ECR-15 | | |
|---|---|---|
| Peak No. | D | I/Io |
| 1 | 15.3236 | 11 |
| 2 | 9.1108 | 100 |
| 3 | 7.9114 | 38 |
| 4 | 6.8966 | 40 |
| 5 | 5.9773 | 13 |
| 6 | 5.5036 | 8 |
| 7 | 5.2687 | 10 |
| 8 | 4.7081 | 12 |
| 9 | 4.3783 | 3 |
| 10 | 3.9511 | 14 |
| 11 | 3.8081 | 99 |
| 12 | 3.7189 | 28 |
| 13 | 3.6232 | 34 |
| 14 | 3.5286 | 72 |
| 15 | 3.1123 | 15 |
| 16 | 3.2744 | 6 |
| 17 | 3.1576 | 75 |
| 18 | 3.0911 | 26 |
| 19 | 3.0386 | 30 |
| 20 | 2.9851 | 18 |
| 21 | 2.9231 | 78 |
| 22 | 2.8361 | 6 |
| 23 | 2.6603 | 9 |
| 24 | 2.6316 | 9 |
| 25 | 2.5240 | 11 |
| 26 | 2.4882 | 16 |
| 27 | 2.3992 | 3 |
| 28 | 2.3798 | 8 |
| 29 | 2.3552 | 2 |
| 30 | 2.2789 | 10 |
| 31 | 2.1882 | 2 |
| 32 | 2.1418 | 9 |
| 33 | 2.1053 | 6 |
| 34 | 2.0842 | 1 |
| 35 | 2.0375 | 1 |
| 36 | 1.9869 | 14 |
| 37 | 1.9550 | 5 |
| 38 | 1.9384 | 3 |
| 39 | 1.9124 | 17 |
| 40 | 1.8972 | 5 |
| 41 | 1.8232 | 7 |
| 42 | 1.7753 | 2 |
| 43 | 1.7630 | 2 |
| 44 | 1.7510 | 12 |
| 45 | 1.7221 | 3 |
| 46 | 1.6898 | 4 |
| 47 | 1.6554 | 12 |
| 48 | 1.6359 | 1 |
| 49 | 1.6028 | 10 |
| 50 | 1.5835 | 3 |

Figure 2:
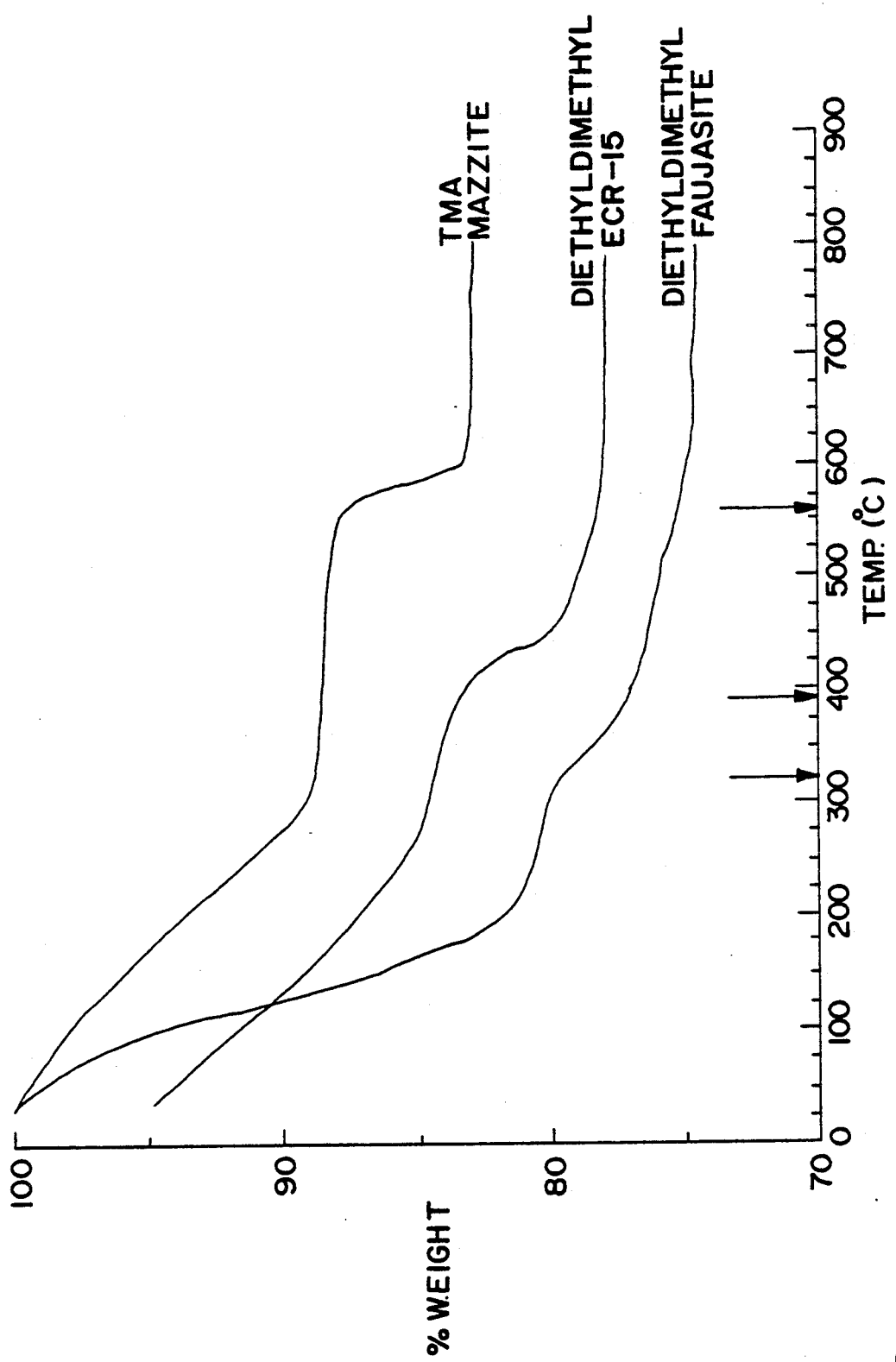
FIG. 2 shows weight loss curves (TGA) as a function of temperature for ECR-15 containing bis(2-hydroxy ethyl)dimethyl ammonium ions in the main channel, a conventional "TMA mazzite" and a faujasite containing dimethyldiethyl ammonium. Note that TMA occupies the small "gmelinite" cage from which it can only be removed at high temperature. The E$_2$M$_2$ template, too big to locate in the "gmelinite" cage, is located in the large 12-ring channel from which it can be easily removed at lower temperatures.

Comparison of the TGA data shown as FIG. 2 should show the clear differences between the mazzite materials made using only TMA and the inventive ECR-15 material primarily containing the larger organic ammonium template.

FIG. 2 also shows the TGA of a faujasite containing an $E_2M_2$ ammonium cation. The cation is removed at about 318° C.

EXAMPLE 4

A gallium $E_2M_2$-ECR-15 was made by reacting a solution of composition 1.2$(RI)_2:1.95\ Na_2O:Ga_2O_3:7.5\ SiO_2:120\ H_2O$ where RI was bis(2-hydroxyethyl) dimethyl ammonium iodide containing trace amounts of TMA. The solution gel was made by first dissolving 9.44 gm $Ga_2O_3$ in a solution of 7.13 gm NaOH in 15 gm H₂O, cooling it to ambient temperature and diluting same with 40 gm H₂O. This solution was then slowly added to 56 gms Ludox HS-40 colloidal silica in a blender, 6.7 gm of a seed solution in Ex. 1, and 64.4 gm of a 50 wt. % solution of bis(2-hydroxyethyl) dimethyl ammonium iodide. H₂O was added to give a total solution weight of 182 gms. After thorough homogenization, the sample was split between two 75 ml steel test tube autoclaves and aged at 150° C. After seven days the sample was removed, filtered, washed and dried. X-ray diffraction showed it to be excellent ECR-15 having the spectrum given in Table 1. Chemical analysis gave a sample stoichiometry of:

0.84 Na₂O:Ga₂O₃:6.52 SiO₂ and a trace of Al (from the seed solution). Thermogravimetric analysis gave an organic ion weight loss of 6.6% at 433° C.

EXAMPLE 5

A gel composition:
1.2 (RI)₂:1.95 Na₂O:0.5 Ga₂O₃:0.5 Al₂O₃:7.5 SiO₂:120 H₂O was made using the method of Ex. 4, except that the 9.44 gm Ga₂O₃ was replaced by 4.82 gm Ga₂O₃ plus 3.85 gms Al₂O₃.3H₂O. After making and reacting in an identical manner to Ex. 4, the product showed the characteristic ECR-15 spectrum, and gave a chemical composition represented by the stoichiometry:

0.79 Na₂O:0.48 Ga₂O₃:0.52 Al₂O₃:6.8 SiO₂.

EXAMPLE 6

Each of two samples of the TMA-mazzite of Example 2 were, respectively, calcined at 330° C., and "burned off" (to remove the TMA). Each of two samples of the ECR-15 material of Example 3 were similarly treated to remove the organic ammonium cation.

Figure 3:
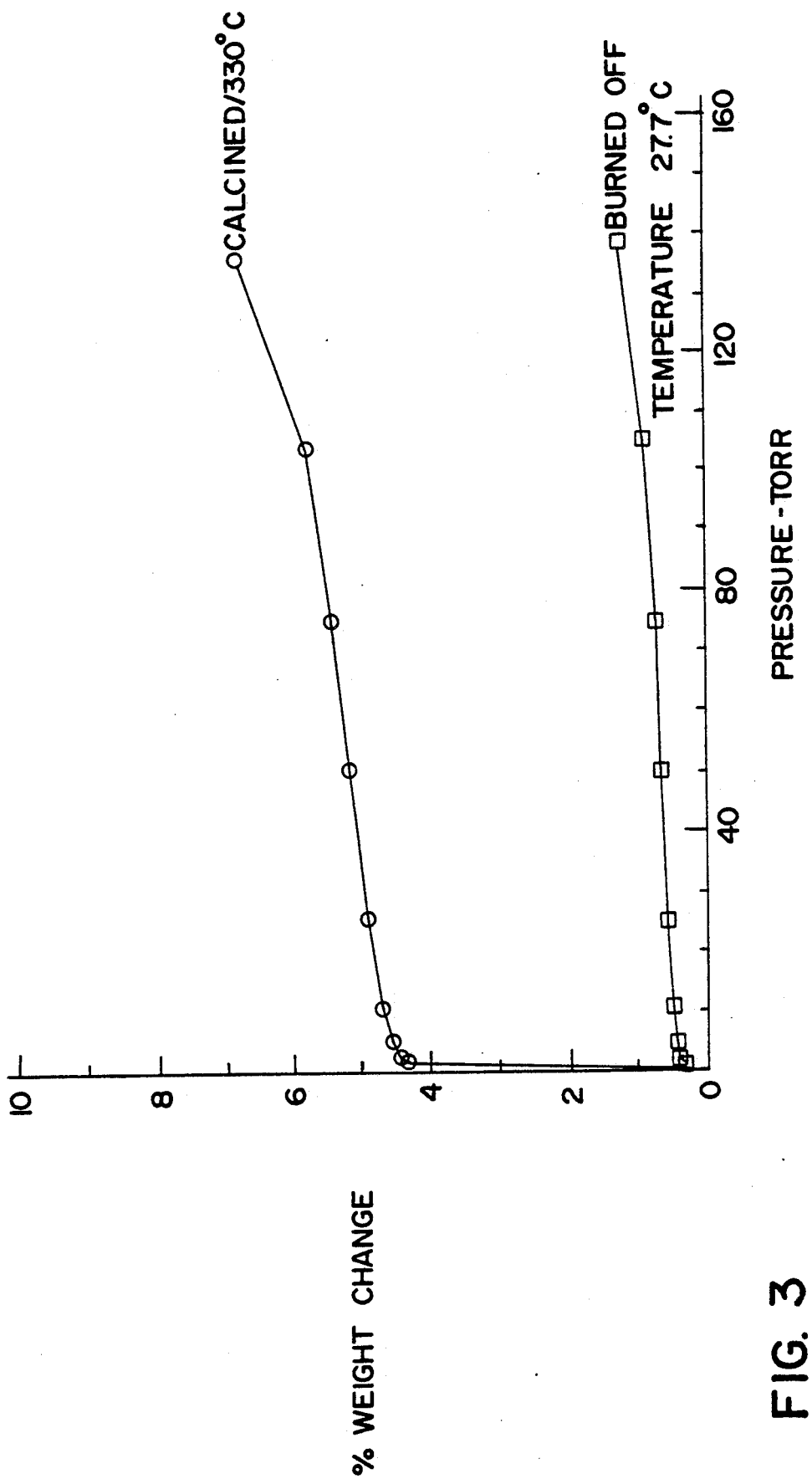
FIGS. 3 and 4 show hexane absorption curves for calcined and "burned-off" TMA-mazzite (ZSM-4, Omega) and ECR-15 materials.

Each of the four samples was then subjected to an isothermal hexane absorption test to determine absorptivity of the samples. The TMA mazzite which had been "burned off" to remove the TMA template showed (in FIG. 3) a hexane capacity of only about 1% hexane. The low capacity suggests that substantial degradation of the mazzite structure occurred as the template left the zeolite. The mazzite calcined at 330° C. showed a hexane capacity of only about 7% hexane by weight.

Figure 4:
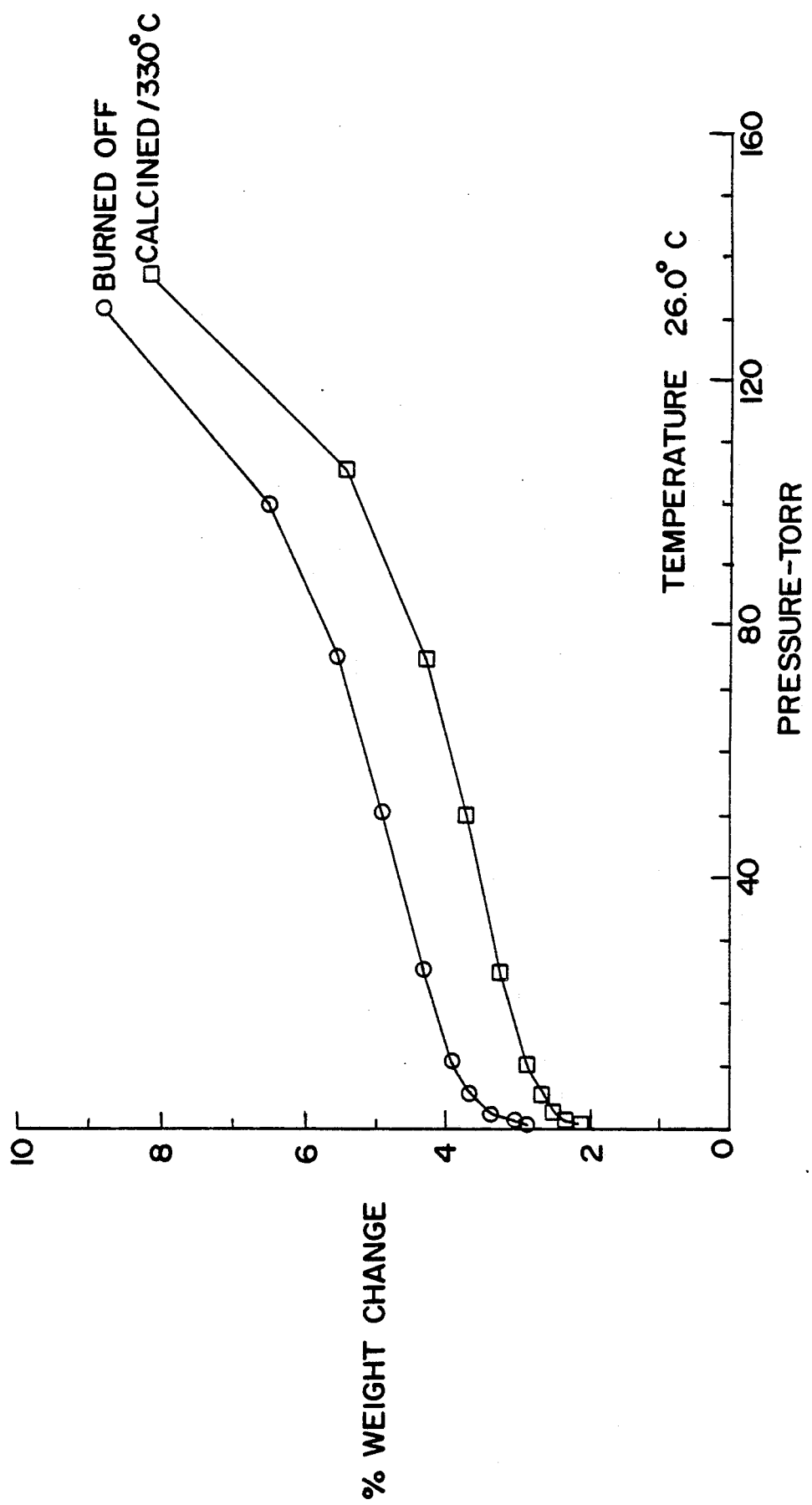

FIG. 4 shows that the ECR-15 which had been "burned off" had a hexane capacity of 9% by weight, almost 900% better than the similarly treated mazzite. The ECR-15 calcined at 330° C. had a hexane capacity of more than 8.3%.

In summary, the present invention is a novel zeolite, ECR-15, which has a mazzite-like structure and contains certain alkyl ammonium cations within its structure. The cations can be readily removed at relatively low calcination temperatures.

What is claimed is:

1. A zeolite characterized by having a mazzite structure having an x-ray diffraction pattern of Table 1 and having TMA and an organic ammonium template selected from the group having the formula R₁R₁R₂R₂N wherein R₁ is methyl or hydroxy-methyl groups and R₂ is ethyl or hydroxy ethyl groups, wherein said organic ammonium templates are within the large channels of said zeolite.

2. The zeolite of claim 1 wherein the organic ammonium template is selected from the group consisting of diethyldimethylammonium, bis-(2-hydroxyethyl)dimethylammonium, 2-hydroxyethyl-2-hydroxymethylammonium and diethyl-2-hydroxymethyl ammonium.

3. The zeolite of claim 2 wherein the organic ammonium template is bis(2-hydroxyethyl) dimethyl ammonium.

4. The zeolite of claim 3 wherein the organic ammonium template is present in an amount equal to about 0.1 to about 0.5 moles of template per mole of alumina in the zeolite.

5. The zeolite of claim 3 wherein the zeolite, after heating to remove the template, has the property of adsorbing more n-hexane than before the heating step.

6. A process for preparing the zeolite of claim 1 which comprises:
(a) preparing a reaction mixture comprising an oxide of sodium, an organic ammonium ion selected from the group having the formula R₁R₁R₂R₂N where R₁ are methyl or hydroxy methyl groups and R₂ are ethyl or hydroxy ethyl groups, water, a source of silica, a source of alumina and/or gallia, TMA salt, and, optionally, sodium aluminosilicate nucleating seeds, said reaction mixture having a composition, in terms of mole ratios of oxides, within the following ranges:

| (Na,T)₂O:(Al,Ga)₂O₃ | 1.5 to 5.0 |
|---|---|
| SiO₂:(Al,Ga)₂O₃ | 6 to 25 |
| H₂O:(Al,Ga)₂O₃ | 100 to 450 |
| (TMA)₂O/(Al,Ga)₂O₃ | 0.005 to 0.05 | where T represents the organic ammonium ion template, and said seeds, if present, in an amount to yield 0.1 to 10 mole percent of the total final total alumina and/or gallia content in said zeolite;
(b) blending the reaction mixture sufficiently to form a substantially homogeneous mixture;
(c) maintaining the reaction mixture at between about 80° C. and 200° C. under autogenous pressure for a sufficient period of time to form crystals of said zeolite; and
(d) recovering said crystals.

7. The process of claim 6 wherein the organic ammonium ion template is selected from the group consisting of diethyldimethylammonium, bis-(2-hydroxyethyl)-dimethylammonium, 2-hydroxyethyl2-hydroxymethylammonium and diethyl-2-hydroxymethylammonium.

8. The process of claim 6 wherein the source of silica is sodium silicate and the sources of alumina are hydrated alumina and an aluminum salt selected from the group consisting of the chloride, sulfate and nitrate salts.

9. The process of claim 6 wherein the reaction mixture is maintained between 95° and 160° C.

10. The process of claim 6 wherein the seeds are present in an amount to yield 0.1 to 10 mole percent of the total alumina and/or gallia content.

11. A process for preparing a zeolite having a mazzite structure, and having bis-(2-hydroxyethyl)imethylammonium ions within the channels of said zeolite which comprises the steps of:
(a) preparing a reaction mixture comprising sodium aluminate, alum, water, sodium silicate, a TMA salt, aluminum sulfate, bis-(2-hydroxyethyl)dimethylammonium halide and nucleating seeds, said reaction mixture having a composition, in terms of mole ratios of oxides, within the following ranges:

| | |
|---|---|
| $(Na,T)_2O:(Al,Ga)_2O_3$ | 1.5 to 5 |
| $SiO_2:(Al,Ga)_2O_3$ | 6 to 25 |
| $H_2O:(Al,Ga)_2O_3$ | 100 to 450 |
| $(TMA)_2O/(Al,Ga)_2O_3$ | 0.005 to 0.05 | wherein T represents a bis-(2-hydroxyethyl)dimethylammonium or diethyl dimethylammonium group, and said seeds being present in an amount to yield 1 to 30 mole percent of the total final alumina and/or gallia content in said zeolite;

(b) blending the reaction mixture sufficiently to form a substantially homogeneous mixture;

(c) maintaining the reaction mixture between 90° and 120° C. under autogenous pressure for a sufficient period of time to form crystals of said zeolite; and (d) recovering said crystals.

12. The process of claim 11 wherein T represents a bis-(2-hydroxyethyl)dimethylammonium group.

* * * * *